United States Patent [19]

Hodes et al.

[11] 4,263,361
[45] Apr. 21, 1981

[54] LAMINATED MATERIAL FOR THE PRODUCTION OF PLAIN BEARING ELEMENTS

[75] Inventors: Erich Hodes, Rodheim; Danilo Sternisa, Nauheim, both of Fed. Rep. of Germany

[73] Assignee: Glyco-Metall-Werke Daelen & Loos GmbH, Wiesbaden-Schierstein, Fed. Rep. of Germany

[21] Appl. No.: 850,159

[22] Filed: Nov. 10, 1977

[30] Foreign Application Priority Data

Feb. 12, 1976 [DE] Fed. Rep. of Germany ....... 2654644

[51] Int. Cl.² .............................................. B32B 5/16
[52] U.S. Cl. ................................... 428/240; 308/3 C; 308/DIG. 7; 308/DIG. 8; 308/DIG. 9; 308/238; 428/241; 428/242; 428/244; 428/246; 428/252; 428/257; 428/259; 428/343; 428/344; 428/356
[58] Field of Search .............. 428/240, 242, 244, 246, 428/257, 241, 252, 344, 354, 251, 259, 273, 384, 402, 356; 308/238, DIG. 7, DIG. 8, DIG. 9, 3 C

[56] References Cited

U.S. PATENT DOCUMENTS

| | | | |
|---|---|---|---|
| 2,322,771 | 6/1943 | Palm et al. | 428/257 |
| 2,539,329 | 1/1951 | Sanders | 428/268 |
| 3,037,893 | 6/1962 | White | 428/229 |
| 3,151,015 | 9/1964 | Griffith | 428/240 |
| 3,594,049 | 7/1971 | Turner | 308/238 |
| 3,825,982 | 7/1974 | DeLavalette et al. | 308/238 |
| 3,950,599 | 4/1976 | Board | 308/238 |
| 3,969,232 | 7/1976 | Turner | 308/238 |
| 4,084,863 | 4/1978 | Capelli | 428/252 |

*Primary Examiner*—James J. Bell
*Attorney, Agent, or Firm*—H. Gibner Lehmann; K. Gibner Lehmann

[57] ABSTRACT

A slide bearing laminate and method for producing the same, wherein a low-friction composite facing or layer is secured to a carrier or foundation strip by a bonding procedure. The composite facing comprises textile material having a low-friction component on one side and a glueable component on the other side, which latter is bonded to the carrier strip. The adhesive or bonding agent preferably occupies the interstices of the composite facing, and is especially formulated to resist failure by being mixed not only with friction and heat-conducting filler elements but also with fibrous fillers which particularly contribute to the failure resistance.

23 Claims, 2 Drawing Figures

LAMINATED MATERIAL FOR THE PRODUCTION OF PLAIN BEARING ELEMENTS

CROSS REFERENCES TO RELATED APPLICATIONS

1. Copending U.S. Application Serial No. 851,398, filed on Nov. 14, 1977 in the name of Erich Roemer and entitled "White Metal Bearing Alloy of Lead, Tin and Copper, for Plain Bearing Laminates".

2. Copending U.S. Application Ser. No. 851,472, filed on Nov. 14, 1977 in the names of Erich Hodes and Danilo Sternisa, entitled "Laminated Material and Method for its Production by means of Thermokinetic Plating".

3. Copending German Application of Erich Hodes and Danilo Sternisa, entitled "Weiszmetall-Lagerlegierung, insbesondere zur Verwendung als Gleitschicht, auf Blei-, Zinn-, Kupferbasis zur Herstellung von Mehrschichtgleitlagern", German Ser. No. P 26 54 644.1 filed in Germany on Dec. 2, 1976, on which application a priority claim is hereby made, pursuant to Section 119 of the Patent Act of 1952.

BACKGROUND

This invention relates to laminated materials for the production of plain bearing elements which are capable of withstanding great pressures and high temperature, which are wear resistant and which need no maintenance. The invention also relates to methods for the production of such laminated plain bearing materials.

A number of bearing materials based on natural and synthetic substances are already known, which have a low coefficient of friction in the dry state and at the same time are permanently heat-resistant to temperatures of 100° C. and more, such materials being the fluorine-containing polymers and graphite. The use of these materials in textile form for slide surface linings or facings is also known; but their usage encounters the difficulty that an adequate bond cannot be obtained with the backing or supporting body through the known cementing or vulcanizing procedures.

It has already been attempted to overcome this difficulty by interweaving, in a known weaving process, threads made of a low-friction material with threads made of a material that is readily joinable by cementing or vulcanizing, in such a manner that the low-friction threads are located on one side of the fabric or facing and the readily-joinable threads located on the other. Such a fabric is then intended to be cemented or vulcanized with its side having the readily-joinable threads to a prepared backing or bearing support strip or body (German Pat. No. 1,174,122). However, it has so far not been possible to produce in this manner a laminated plain bearing material which can be conventionally processed into plain bearing elements in a manufacturing operation used for plain bearings, because the bonding strength attained to date is manifestly insufficient to process (bend, shape etc.) such a laminated material into the required plain bearings. And any individualized application of a bearing surface or facing to a prepared foundation base (supporting) body leads to an expensive production method which is feasible only for small-lot production and clearly not economical for practical requirements, despite the known increase in compressive strength which results from the inclusion of a fabric structure in the bearing material (U.S. Pat. No. 2,322,771).

As practical experience teaches, a better bond cannot be achieved either by using a fabric thread material (U.S. Pat. No. 3,037,893) in which the strands or thread materials are composed of carbon-fluoride resin fibers with at least one other type of fiber of a material having better bonding capability to the base or bearing support material than the carbon-fluoride resin. Even using such low friction fabrics, a working bond can only be established with prepared surfaces of the bases or bearing support bodies.

A multiplicity of different attempts to build up the bearing surface of a plain bearing element with fiber material or fabric has also been undertaken. It is known, for example, to use inorganic fabrics coated or impregnated with fluorine-containing polymers (see U.S. Pat. No. 2,539,329). Molded parts with fluorine-containing mixed polymer fabrics in thermoplastic supporting compounds that are mixed with fibers and produced by injection molding methods, have also been already proposed. Also known are molded parts with a full polymer fabric containing fluorine in a thermosetting supporting compound (see U.S. Pat. No. 2,885,248). Moreover, many methods are known by which low-friction threads are applied to the bearing side of a plain bearing by winding or weaving, with a supporting or adhering compound being subsequently sprayed or pressed around the threads.

But all hitherto-known manufacturing methods for producing a plain bearing element which is capable of withstanding great pressures and high temperatures and which needs no maintenance have the important drawback of being feasible only in heavily labor-intensive production operations, and such methods can hardly be considered for mass production operations.

On the other hand, a suggestion is already also known, according to which PTFE (polytetrafluoroethylene) threads and metal threads are to be processed into a double-sided fabric. That particular side of the double-sided fabric which shows essentially the metal threads is then intended to be soldered continuously to a base strip or supporting band. Individual plain bearing parts are then supposed to be cut or formed from the laminated band that is obtained by the above soldering of the supporting band and the mixed fabric band together. Practice has shown, however, that the solder connections in such a known laminated material are not suited to withstand, without damage, the conventional production operations that are used in forming plain bearing parts out of compound or laminate material bands, and do not provide a sufficiently reliable bond between the compound or composite fabric and the supporting body in the finished bearing part.

SUMMARY

In view of this it is an object of the present invention to provide a source or supply of laminated plain bearing material which assures the required properties of high pressure loadability, heat resistance, wear resistance and freedom from maintenance which are at least as good as the known linings or facings comprising fabric-containing materials of low friction fiber material and also readily-bondable fiber material, said source being suited especially for use in a conventional, economical, existing plain bearing manufacturing process without impairment of the laminate properties. Involved in the object of the invention is the recognition that, in order to be incorporated into a known production method, the laminated material must be capable of being fed to the processing machines or processing tools either in coil form, or band form, or else in the form of a strip. Of these forms, the material when in band form should offer the best conditions for the low cost production of plain bearing parts.

According to the invention, the problem that is posed is solved by firmly joining a low-friction composite textile structure which is readily glueable on one side, to a base or carrier material produced in band form by means of a unique adhesive substance constituted not only of friction and heat-conducting fibers but also of fibrous fillers as well. What the invention achieves involves an adhesive agent which is compatible with both the base or carrier material in band form and the glueable component of the textile structure, and which of itself can have naturally poor friction and sliding properties since these properties of the adhesive agent can be suitably varied through the proper choice of the friction-reducing fillers making up the adhesive substance or mixture. By the term "glueable" the patentee designates any material which is capable of being attached to another surface by means of a glue or glue-like substance, such substance including heat-settable and cold-hardening substances, in addition to those which harden only by a chemical action. And any adhesive substance which can be utilized to bond one material to another is intended to be included in the definition of "glue". A glueable component of a material is a part which is readily glueable and which can be adhered, cemented or bonded in a practical manner to another surface by means of a glue. Given below are examples of glues or adhesive agents, such as thermal setting and/or thermoplastic synthetic materials, as well as cold-solidifying or cold-hardening materials which can be used as the adhesive agent, within the scope of the invention. One might assume at first blush that inclusion of fillers in the basic adhesive agent would result in impairment of the bond between the composite fabric and the base or band of the carrier material. However, we have found surprisingly that the fillers selected have no such adverse effect on the bonding strength, not even those fillers which assume the function of heat conductors. It is important for the purposes of the invention, however, that the distribution of the fillers within the adhesive agent be as uniform as possible.

Since low-friction fillers often have a tendency to distribute themselves irregularly under pressure on the surface of a composite material or mixture, it is important, according to the invention, to inhibit the migration of such filler particles by the addition of other, fibrous fillers to the adhesive agent.

Practice has proven surprisingly that, with suitable selection of materials, the coating on all sides (or impregnation) of a low-friction composite fabric with a friction-reducing adhesive substance in the form of an agent containing fibrous substances, can increase even more considerably the pressure loadability, heat resistance, dry run qualities and thus the wear resistance of the laminated bearing material.

In addition, there is had a particularly favorable opportunity to eliminate the difficulties occurring in the mechanical processing of plain bearing layers due to the formation of lint. Lint forming at the cut edges often causes unavoidable rework of the unfinished or finished product, which therefore interferes with production. It is now possible, within the scope of the invention, to eliminate by the proper selection of the fillers, this lint formation in the continuous production of the laminated material or stock. The undesirable lint formation is completely inhibited by the envelopment, caused mainly by the short fiber filler material such as asbestos, or the resin-hardener substance as enriched by the fillers, so that no additional machining operations are required in the further mechanical processing of the bearing parts.

Accordingly, the preferred substances to be utilized for the manufacture of the present improved laminated bearing material include a compound or composite material comprising a mixed fabric having a PTFE facing, with a cotton back as the second component of the fabric, the latter serving primarily to effect the bonding.

According to the invention, the adhesive agent having incorporated in it the friction and heat conducting fillers in conjunction with fibrous fillers, can preferably be present in the entire coating and also on the bearing surface of the plain bearing part. This achieves optimum adhesion of the facing or coating to the carrier material, in conjunction with optimum cohesion of the textile structure making up the coating, and yet there is had good reduced-friction running properties on the plain bearing slide surface.

The base or carrier material in band form can be either metallic or nonmetallic.

Within the scope of the invention, the textile structure can consist of an anti-friction material essentially on the plain bearing running surface side, and a glueable material on the carrier side, and the textile structure can be of fleece or felt, either a full or else a mixed fabric.

The low-friction fibers or threads of the textile structure can consist of synthetic, mineral or metallic material. This can include, for instance: Fluorine-containing polymers and/or polymethacrylates and/or polyalkylenterephtalates and/or polyacetales and/or polyamides and/or polyimides and/or vinylchloride polymerides and copolymerides and/or polycarbonates and/or polyarylensulfones and/or glass and/or graphite and/or carbon and/or boron and/or boron nitride and/or plain bearing metal, but preferably stretched PTFE filaments.

Within the scope of the invention, the glueable fibers or threads or yarns of textile structure can consist of natural, mineral, synthetic or metallic material. This can include, for instance: Cotton, preferably cotton yarns, linen, wool, natural silk, flax, jute, glass, asbestos, polyamide, polyimide, polyacrylimide, polyacrylnitril, copper, bronze, iron, aluminum & their alloys.

The adhesive agent can consist of thermosetting and/or thermoplastic synthetic material such as phenolic resin, epoxide resin, silicone resin, acetalic resin, polyester resin, polyamide resin, polypropylene, polycarbonate, polyacetal, polyethylene, ABS resins and the like.

A cold-solidifying or cold-hardening epoxide resin/hardener substance can be used preferably as the adhesive agent, within the scope of the invention. For example, such an epoxide resin/hardener substance is particularly well suited in the manufacture of a compound material or mix adapted to impregnate a PTFE mixed fabric, and well suited for hardening the resin subsequently.

Within the scope of the invention, the cold-solidifying or cold-hardening substance performs two functions. First, the mixed fabric is immediately fixed to the carrier or base material so that there is intensive adhesion to withstand high pressure loads at increasing temperatures. Secondly, the cold-solidifying or cold-hardening resin/hardener substance is used to firmly envelop the threads of the fabric and to provide additional stability and compression strength after hardening.

The cold-solidifying or cold-hardening resin/hardener substance or material can preferably be selected in accordance with specific properties. The viscosity of the resin/hardener substance in a temperature range between 40° C. and 90° C. should be equal to or smaller than 20 poise to assure complete impregnation of the fabric.

It has been the general practice heretofore to employ predominantly thermosetting resins for the impregnation of fabrics which are to be glued onto a supporting body. In essence, there has so far been claimed as an advantage of this procedure that the transition from the "A" state to the "B" state takes place prior to the final processing of the plain bearing parts, and that the final hardening of the resin/hardener substance occurs only after this final processing. But this leaves unmentioned the fact that, for the execution of the hardening process, the entire workpiece must be subjected to a supplemental heat treatment after the facing piece is bonded to the base or supporting body.

In contrast with this, the use of a cold-soldifying or cold-hardening resin/hardener substance as provided herein within the scope of the invention offers the advantage that, due to the quick transition of the resin from the "A" state to the "B" state and thence to the "C" state, high production speeds never before achievable with thermosetting resins can be employed. Due to the rapid transition of the resin from the "A" state to the "B" state, the mixed fabric that is filled with the resin/hardener/filler substance is fixed quickly to the carrier material so that no additional band or fabric guiding means are required upon arrival at the pressing zone.

Since, as is known, thermosetting materials generally have unfavorable sliding friction properties, a solid lubricant and, if applicable, an additional heat-conducting filler are incorporated in the resin before it is mixed with the hardener. This filler can be selected from the following substances, or it can be a mixture selected from the following substances: Metal oxide, metal carbide, metal boride, metal sulfide, lead, cadmium, copper, bronze, tin, silver, aluminum, molybdenum sulfide, graphite, carbon, indium, thallium, silicon, nickel, magnesium, antimony, and plain bearing alloys in powder form, in whisker form or cermets.

We have found in the production of the above adhesive substance that, with constantly decreasing viscosity of the resin/hardener substance, the solid lubricant dissociates, accumulating at the edge of the material or bearing part. Surprisingly, this problem is solved within the scope of the invention by the addition of the short-fibered material such as asbestos fibers, thereby insuring uniform distribution of the solid lubricant in the resin/hardener substance. In addition to asbestos, fibrous material consisting of glass, boron nitride, graphite, carbon, molybdenum, silicon dioxide, copper, silver, aluminum, and synthetic materials and wiskers can also be used. The fiber length preferably is restricted to 0.01 to 0.3 mm.

The filler material ($MoS_2$, graphite, carbon and the like) should preferably amount to 5 to 20 percent by weight relative to the resin/hardener substance. The fiber filler material should preferably amount to 30 to 45 percent by weight, also relative to the resin/hardener substance. The weight percentage of the solid lubricant, such as $MoS_2$, and of the fiber material such as asbestos fiber, should preferably be in the composition of 20% solid lubricant and 30% fibers.

Particularly well suited for the production of a laminated material according to the invention is a method in which a supporting material or base in band form is coated with the adhesive agent mixed with friction and heat conducting as well as fibrous fillers after which low-friction and glueable composite fabric is continuously applied to the adhesive agent layer to be impregnated thereby and subsequently glued or vulcanized to the base under the action of heat and pressure while its thickness is simultaneously reduced to a desired size. Such a production method can be carried out easily, safely and quickly with simple, conventional machines. It can be carried out either on one or on both sides of the supporting material or base in band form.

Another variation of the method which can be carried out just as well, within the scope of the invention, consists in coating or impregnating a low-friction and glueable composite fabric on one or both sides with an adhesive agent mixed with friction and heat-conducting as well as fibrous fillers, continuously applying the thus-treated fabric to a base or supporting material in band form, gluing or vulcanizing the resultant laminate by the action of heat and pressure while reducing its thickness to a desired size.

One embodiment or example of the method according to the invention is explained below in greater detail with reference to the accompanying drawing.

Figure 1:
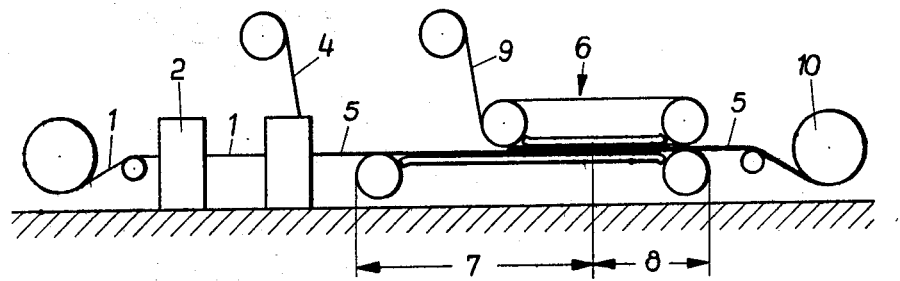
FIG. 1 is the schematic representation of a production machine.

A steel band 1 used as a base or carrier material is pulled continuously through a conventional cleaning station 2 and thence into a dosing station 3. A supply of mixed PTFE/cotton fabric 4 is continuously fed to the dosing station 3. Before the mixed PTFE/cotton fabric is applied to the steel band 1, the side of the steel band which is to carry the fabric is coated at the dosing station 3 with a cold-hardening epoxide resin/hardener substance. Furthermore, before the mixed PTFE/cotton fabric is placed on the steel band 1 it is impregnated by the same cold-hardening epoxide resin/hardener substance. After combining the steel band 1 with the mixed PTFE/cotton fabric band 4, the top side of the resultant composite band 5 is wiped by a doctor blade. The composite band 5 is then run into a known double band press 6 (see VDI-Nachrichten No. 13/73 "The Transport Band as Reactor"). The front area 7 of this double band press 6 is heated to, say, about 90° to 100° C. to accelerate the hardening process while being cooled in its rear area 8. The desired pressure conditions and the desired coating thickness reduction is adjusted by adjusting the band spacing of the double band press. In addition, a separating foil 9 is placed on the top side of the compound material band 5. The foil 9 can be eventually wound into the roll 10 for the composite material band 5 coming out of the double band press 6, or it can be wound up again immediately behind the double band press 6. As an alternative, the transport belt of the double band press 6 could be provided with a separating means or separating layer.

The above described method can also be executed continuously on panels, flats or strips. For this purpose a procedure could be employed where a conveyor belt runs through the machine shown in the drawing, which belt is either unwound from one roll and rewound on another roll like the steel band pictured in the drawing, or else revolved endlessly through the machine. The panels, flats or strips to be coated are then placed on this conveyor belt closely adjacent to each other so as to pass through the machine with the conveyor belt in the same manner as the steel band 1 shown in the drawing. If the panels, flats or strips of the carrier material are placed on the belt closely adjacent to each other, all other components of the machine can be designed as described above.

Figure 2:
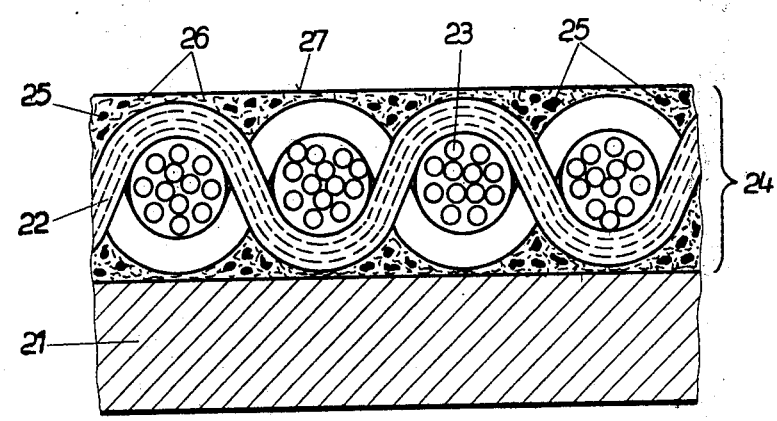
FIG. 2 is a section, greatly enlarged, of a piece of laminated bearing material.

FIG. 2 shows a section of a piece of laminated bearing material made according to the invention. On a base or carrier 21 such as of steel, a two-sided fabric of stretched PTFE fibers 22 and cotton fibers 23 is embedded in an adhesive substance layer 24 containing an adhesive agent. In the example shown, the adhesive substance 24 is a cold-hardening resin/hardener substance. The adhesive agent of the layer 24 contains fillers 25 which improve the sliding properties and the heat-conduction qualities, such as molybdenum disulfide in powder form and stannous bronze powder, and contains mechanically reinforcing asbestos fibers 26 preferably of a length between 0.01 and 0.3 mm. The adhesive substance 24 extends right up to the actual bearing running surface 27.

All features characterized in the specification, the patent claims and the drawing can be of essential significance for the invention, either alone or in any combination thereof.

What is claimed is:

1. Laminated material for the production of plain bearing elements which are adapted to carry heavy loads and to be heat and wear resistant and maintenance free, comprising in combination:
   (a) a carrier strip in the form of a thin band,
   (b) a composite facing member of woven textile material,
   (c) said facing member having a low-friction component on one side, comprising textile strands of synthetic material constituting a sliding bearing surface, and having a glueable component on the other side, comprising textile strands of natural material constituting a bonding surface,
   (d) a bonding agent securing the glueable component of the facing member to the carrier strip whereby said member presents its sliding bearing surface, in exposed position,
   (e) said bonding agent having mixed in it particles of friction reducing and heat-conducting material, and further having mixed in it fibrous reinforcing fillers which contribute to the strength of the bond between the facing member and carrier strip.

2. Laminated material as in claim 1, characterized by:
   (a) said bonding agent being contained throughout said facing member and being also present in the sliding bearing surface thereof.

3. Laminated material as in claim 1, wherein:
   (a) said carrier strip is metallic.

4. Laminated material as in claim 1, wherein:
   (a) said carrier strip is non-metallic.

5. Laminated material as in claim 1, wherein:
   (a) the strands of natural material comprise fibers from animal sources and from vegetation.

6. Laminated material as in claim 1, wherein:
   (a) the strands of the low-friction component of the facing member comprises synthetic fibers of plastic formulation.

7. Laminated material as in claim 1, wherein:
   (a) the strands of the low-friction component of the facing member comprises fibers of mineral material.

8. Laminated material as in claim 1, wherein:
   (a) the strands of the low-friction component of the facing member comprises fibers of metallic alloy material.

9. Laminated material as in claim 6, wherein:
   (a) the plastic formulation of the synthetic fibers comprises a fluorine-containing compound.

10. Laminated material as in claim 9, wherein:
    (a) the synthetic fibers are constituted of PTFE.

11. Laminated material as in claim 1, wherein:
    (a) the bonding agent comprises a synthetic resin.

12. Laminated material as in claim 1, wherein:
    (a) the particles of friction and heat-conducting material are metallic.

13. Laminated material as in claim 1, wherein:
    (a) the fibrous reinforcing fillers comprise natural substances.

14. Laminated material as in claim 1, wherein:
    (a) the fibrous reinforcing fillers comprise synthetic substances.

15. Laminated material as in claim 1, wherein:
    (a) the fibrous reinforcing fillers comprise metallic substances.

16. Laminated material as in claim 1, wherein:
    (a) the adhesive coating contains from 5% to 20% by weight of a solid lubricant.

17. Laminated material as in claim 16, wherein:
    (a) the solid lubricant comprises carbon.

18. Laminated material as in claim 16, wherein:
    (a) the adhesive coating contains asbestos fibers.

19. Laminated material as in claim 18, wherein:
    (a) the asbestos fibers constitute from 30% to 45% by weight of the adhesive coating.

20. Laminated material as in claim 18, wherein:
    (a) the asbestos fibers are between 0.01 mm and 0.30 mm long.

21. Laminated material as in claim 11, wherein:
    (a) the bonding agent comprises one or more of the materials selected from the group consisting of phenolic resin, epoxide resin, silicon resin, acetal resin, polyester resin, polyamide resin, polypropylene, polycarbonate, polyacetal, polyethylene, ABS resin.

22. Laminated material as in claim 1, wherein:
    (a) the friction and heat-conducting fillers comprise one or more of the materials selected from the group consisting of metal oxide, metal carbide, metal boride, metal sulfide, lead, cadmium, copper, bronze, tin, silver, aluminum, molybdenumdisulfide, graphite, carbon, indium, thallium, silicon, nickel, magnesium, antimony, plain bearing alloys in powder form, in whisker form or cermets.

23. Laminated material as in claim 1, wherein:
    (a) the fibrous filler comprises asbestos, glass, boron, nitride, graphite, carbon, molybdenum, silicon dioxide, copper, silver, aluminum, synthetic materials, including whisker formations.

* * * * *